United States Patent [19]
Boberg et al.

[11] Patent Number: 5,959,420
[45] Date of Patent: Sep. 28, 1999

[54] HEAT ENGINE AND ELECTRIC MOTOR TORQUE DISTRIBUTION STRATEGY FOR A HYBRID ELECTRIC VEHICLE

[75] Inventors: Evan S. Boberg; Brian P. Gebby, both of Hazel Park, Mich.

[73] Assignee: Chrysler Corporation, Auburn Hills, Mich.

[21] Appl. No.: 08/982,047

[22] Filed: Dec. 1, 1997

[51] Int. Cl.⁶ ...................................................... H02P 7/00
[52] U.S. Cl. ........................ 318/432; 318/587; 318/139; 318/254; 318/138; 318/439; 318/434; 180/282
[58] Field of Search .................................. 318/587, 139, 318/254, 138, 439, 434; 180/282; 123/40; 477/189, 180

[56] References Cited

U.S. PATENT DOCUMENTS

| | | |
|---|---|---|
| 3,916,862 | 11/1975 | Clouse et al. ........................ 123/140 X |
| 4,149,507 | 4/1979 | Little, Jr. et al. ........................ 123/140 |
| 5,376,869 | 12/1994 | Konrad ..................................... 318/587 |
| 5,578,911 | 11/1996 | Carter et al. . |
| 5,680,917 | 10/1997 | Bray .................................... 477/180 X |
| 5,695,430 | 12/1997 | Moyer .................................... 477/189 |

*Primary Examiner*—Karen Masih
*Attorney, Agent, or Firm*—Jennifer M. Stec

[57] ABSTRACT

A method is provided for controlling a power train system for a hybrid electric vehicle. The method includes a torque distribution strategy for controlling the engine and the electric motor. The engine and motor commands are determined based upon the accelerator position, the battery state of charge and the amount of engine and motor torque available. The amount of torque requested for the engine is restricted by a limited rate of rise in order to reduce the emissions from the engine. The limited engine torque is supplemented by motor torque in order to meet a torque request determined based upon the accelerator position.

8 Claims, 7 Drawing Sheets

HEAT ENGINE AND ELECTRIC MOTOR TORQUE DISTRIBUTION STRATEGY FOR A HYBRID ELECTRIC VEHICLE

STATEMENT OF GOVERNMENT INTEREST

The government of the United States of America has rights in this invention pursuant to Subcontract No. ZAN-6-16334-01 awarded by the U.S. Department of Energy.

BACKGROUND OF THE INVENTION

Field of the Invention

The present invention relates generally to a hybrid electric vehicle and, more particularly, to a heat engine and electric motor torque distribution control strategy for a hybrid electric vehicle.

BACKGROUND AND SUMMARY OF THE INVENTION

Since the invention of power vehicles, many different powertrain systems have been attempted, including a steam engine with a boiler or an electric motor with a storage battery. It was, however, the discovery of petroleum in 1856 and the four-stroke internal combustion engine invented by Otto in 1876, that provided the impetus for the modern motor vehicle industry.

Although fossil fuel emerged as the fuel of choice for motor vehicles, recent concerns regarding fuel availability and increasingly stringent federal and state emission regulations have renewed interest in alternative fuel powered vehicles. For example, alternative fuel vehicles may be powered by methanol, ethanol, natural gas, electricity, or a combination of these fuels.

A dedicated electric powered vehicle offers several advantages: electricity is readily available, an electric power distribution system is already in place, and an electric powered vehicle produces virtually no emissions. There are, however, several technological disadvantages that must be overcome before electric powered vehicles gain acceptance in the marketplace. For instance, the range of an electric powered vehicle is limited to approximately 100 miles, compared to approximately 300 miles for a similar fossil fuel powered vehicle. Further, the costs of batteries are significantly more than that of a comparable fossil fuel powered vehicle.

Hybrid powered vehicles, powered by both an internal combustion engine and an electric motor, have been widely proposed for overcoming the technical disadvantages of a dedicated electric vehicle while still offering an increased efficiency. The performance and range characteristics of a hybrid powered vehicle is comparable to a conventional fossil fuel powered vehicle. However, a great deal of development is still necessary in order to provide a hybrid electric vehicle which would be widely accepted by the consuming public. The present invention deals with the issue of determining a desirable amount of torque distribution by the engine and electric motor of a hybrid electric vehicle in order to provide the benefits of rapid acceleration, increased fuel economy, and reduced emissions. Thus, there is a need in the art for a hybrid powertrain system for a motor vehicle that is energy efficient, has low emissions, and offers the performance of a conventional fossil fuel powered vehicle.

Accordingly, it is an object of the present invention to provide an improved power distribution system for a hybrid powertrain system.

To achieve the foregoing objects, the present invention provides a hybrid powertrain system for a motor vehicle including a transmission operably connected to an engine of the motor vehicle, and an electric motor/generator operably connected to the transmission, wherein the electric motor/generator produces either one of positive and regenerative torque. The engine and motor torque are distributed according to a distribution strategy in order to provide reduced emissions while maintaining the desired amount of responsiveness to the accelerator position.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
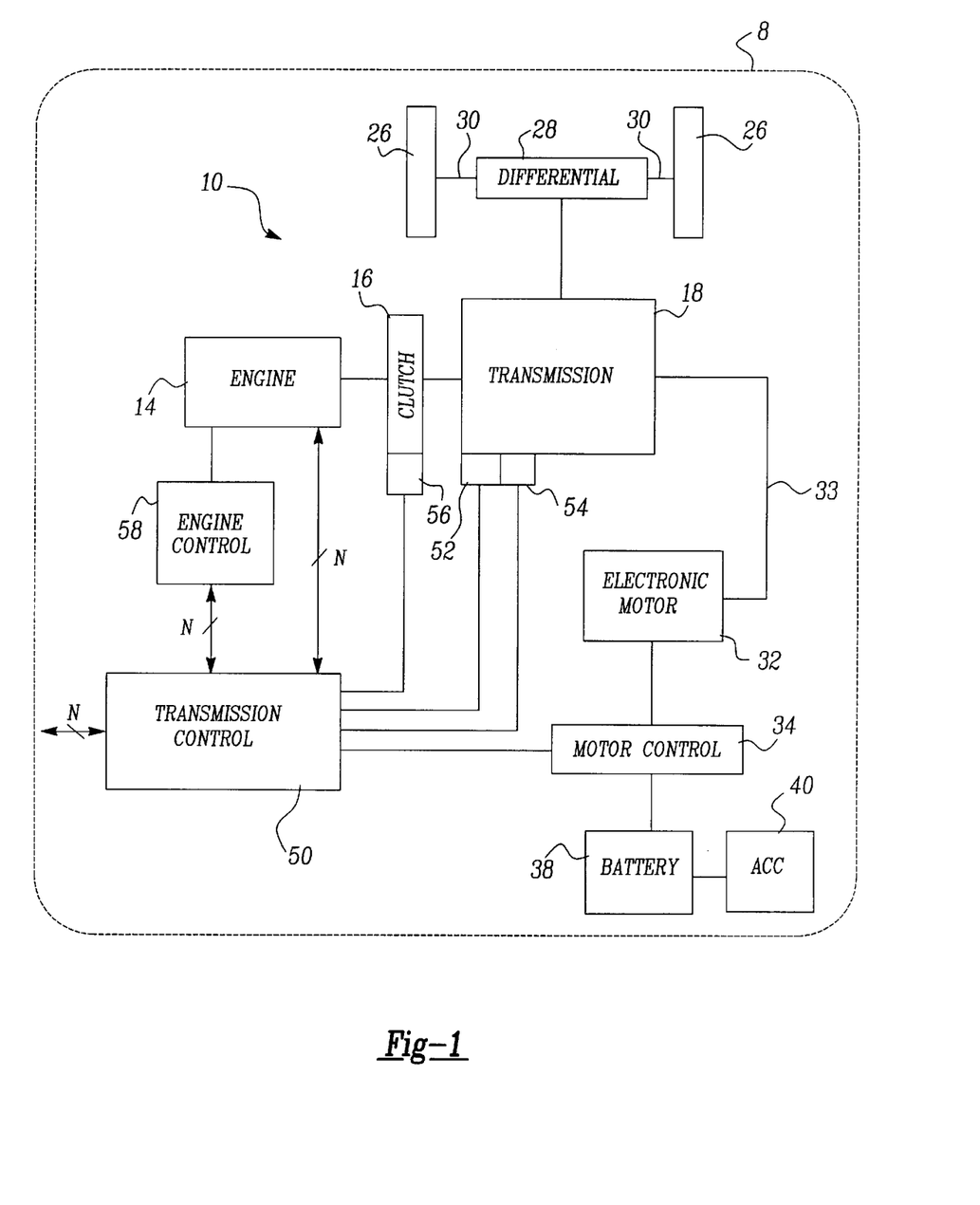
FIG. 1 is a schematic diagram of a hybrid powertrain system for a motor vehicle according to the present invention.
Figure 2:
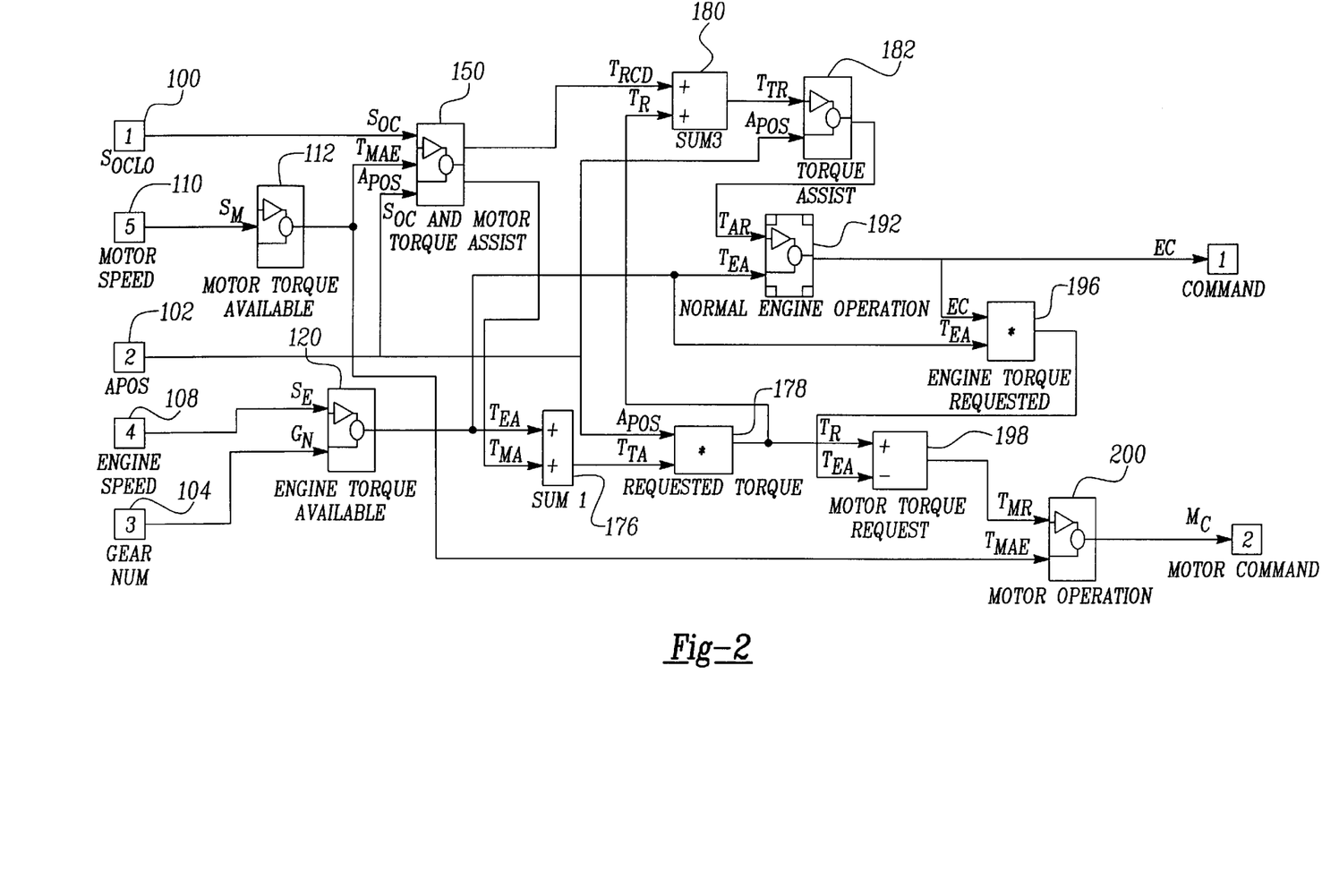
FIG. 2 is a data flow diagram showing the torque distribution control strategy for the hybrid powertrain system according to the principles of the present invention.

Referring to FIG. 1, a hybrid powertrain system 10, according to the present invention, is illustrated for a motor vehicle, generally shown at 8. The hybrid powertrain system 10 includes a heat engine 14 operating on a hydrocarbon based or fossil fuel. In this example, the engine 14 is a compression-ignited engine fueled by a diesel fuel. Preferably, the engine 14 is sized comparable to an engine for a nonhybrid motor vehicle.

The hybrid powertrain system 10 also includes a clutch mechanism 16, as is known in the art, for operably interconnecting engine 14 and transmission 18. The Clutch mechanism 16 compensates for the difference in rotational speed of engine 14 and transmission 18, to smooth engagement between engine 14 and transmission 18.

Transmission 18 connects to engine 14 through clutch 16 and transmits engine rotation and power at various ratios to a pair of drive wheels 26 of the motor vehicle. Thus, transmission 18 enables the motor vehicle 8 to accelerate through predetermined gear ratios, while engine 14 functions within a predetermined operating range. Examples of known transmission types include an automatic transmission, a manual transmission and a continuously variable transmission. It should be appreciated that in a preferred embodiment transmission 18 is a five-speed manual transmission as is well known in the art.

Transmission 18 drives a differential unit 28. Differential unit 28 engages a pair of axle shafts 30 which are operably connected to the pair of wheels 26.

The hybrid powertrain system 10 also includes an electric motor 32 operably connected to transmission 18 at the opposite end of an input shaft from clutch 16. Electric motor 32 is connected to the input shaft opposite from clutch 16 by a gear train 33. The electric motor 30 is able to provide both positive and regenerative torque, by functioning as a motor and a generator, respectively. An example of an electric motor 32 is an induction motor or a permanent magnet motor, such as manufactured by Delphi Electronics Corporation.

As a generator, electric motor 32 produces a regenerative torque, preferably as an alternating current (A/C), which is transferred to a control mechanism, such as a motor controller 34. Motor controller 34 changes the alternating current into a direct current (D/C), as is well known in the art. The direct current may then be transmitted to an energy storage apparatus 38, such as a battery. Alternatively, as a motor, the electric motor 32 produces a positive torque that is applied to the input shaft of the transmission 18 and is ultimately used to drive wheels 26.

Motor vehicle 8 is provided with a regenerative braking system, capable of capturing kinetic energy from the momentum of the motor vehicle as it is slowing down and storing this energy as potential energy in the energy storage apparatus 38 to be described. Electric motor 32 slows the motor vehicle down by applying a braking force that slows down the rotation of the input shaft. Electric motor 32 functions as a generator and captures the reverse energy flow.

Hybrid powertrain system 10 also includes a transmission controller 50, such as an electronic control unit. Transmission controller 50 enables electronic control of transmission 18 to enable the transmission 18 to be configured as a manual-style transmission, but to be operated from a drivers standpoint as an automatic transmission. To effect such operation, transmission 18 has a pair of actuators 52 and 54 which simulate positioning of the stick shift actuators as in a conventional manual transmission. Further, actuator 56 enables operation of clutch 16 in replacement of a clutch pedal as on a conventional manual transmission. In order to generate such control signals, transmission controller 50 receives input signals from engine 14 or an engine controller 58. Examples of such information received from engine 14 or engine controller 58 include vehicle speed, RPM, or the like. Similarly, transmission controller 50 generates output signals to control actuators 52, 54, and 56 and also outputs diagnostic and other communication signals to engine 14 and/or engine controller 58. Transmission controller 50 may also receive other vehicle condition signals, depending on a particular configuration of the transmission 18.

In operation, as will be described in greater detail herein, transmission controller 50 receives input signals from engine 14, engine controller 58, clutch 16, clutch actuator 56, transmission 18, and from additional sensors. Actuator 56 is preferably a rotary actuator which causes linear movement to effect engagement and disengagement of clutch 16. With respect to actuators 52 and 54, these actuators combine to mimic movement of the shift lever in a conventional manual transmission. That is, in visioning the standard "H" shaped shift configuration, actuator 52 may operate as the cross over actuator, i.e., determining what leg of the "H" the shifter is in. Similarly, actuator 54 operates as a select actuator which mimics an upward or downward movement of the shifter within the leg of the H. The actuators 52, 54, and 56 receive control signals from transmission controller 50 to operate the shifting portion of transmission 18 as in a conventional manual transmission. Further, transmission controller 50 sends control signals to electric motor 32 through motor controller 34, to effect activation and deactivation of electric motor 32 as determined by the control strategy described herein.

Hybrid powertrain system 10 includes an energy storage apparatus 38, such as battery, to store potential energy for later use by the motor vehicle. For example, the potential energy stored in the battery may be transferred, as DC current, to operate an accessory component 40. In a typical motor vehicle, engine 14 operably supplies a battery with potential energy. In this example, electric motor 32 operating as a generator supplies battery 38 with potential energy for storage.

Hybrid powertrain system 10 includes at least one accessory component 40. An example of an accessory component may be a power steering pump, a water pump, a lighting system, and a heating and cooling system, which are all conventional and well known in the art. Accessory components 40 are usually mechanically driven by the engine 14 or electrically powered with energy from battery 38. For example, accessory component 40, such as the power steering pump, is operably connected to engine 14 and mechanically driven by engine 14. The lighting system relies on energy supplied by the battery 38, as a source of power.

Upon command from the motor controller 34, battery 38 supplies potential energy, such as a D/C current, to motor controller 34, which converts it into an A/C current. The A/C current is directed to the electric motor 32, causing it to act as a motor and produce a positive torque. The positive torque is applied to the transmission 18, which in turn induces the rotation of the axle shaft 30 and the rotation of the drive wheels 26 of the motor vehicle.

With reference to FIGS. 2–8, a heat engine and electric motor torque distribution strategy for a hybrid electric vehicle will be described. FIG. 1 illustrates the data flow diagram for the torque distribution strategy of the present invention. The torque distribution strategy includes first detecting a state of charge of a vehicle battery (SOC) at 100, detecting an accelerator position (APOS) at 102, detecting a gear number (GN) at 104, detecting an engine speed ($S_E$) at 108, and a motor speed ($S_M$) at 110.

Figure 3:
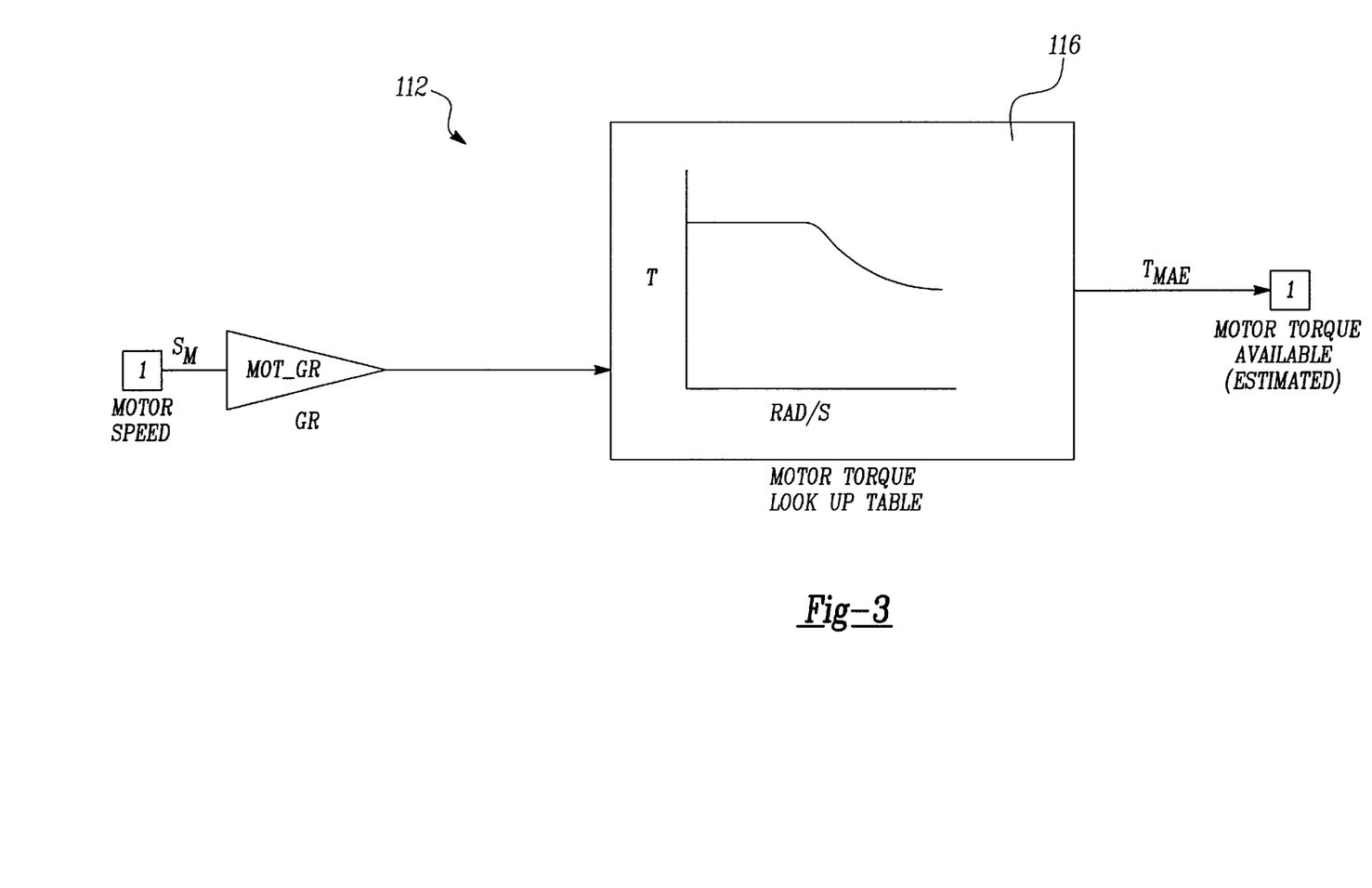
FIG. 3 is a data flow diagram illustrating the calculation of the estimated motor torque available according to the principles of the present invention.

An estimated amount of motor torque available $T_{MAE}$ is detected at 112. With reference to FIG. 3, the motor speed $S_M$ as converted by the gear ratio of the gear train 34 (at 114) is input into a motor torque look-up table 116 and based upon the motor speed, an estimated motor torque available value $T_{MAE}$ is obtained.

Figure 4:
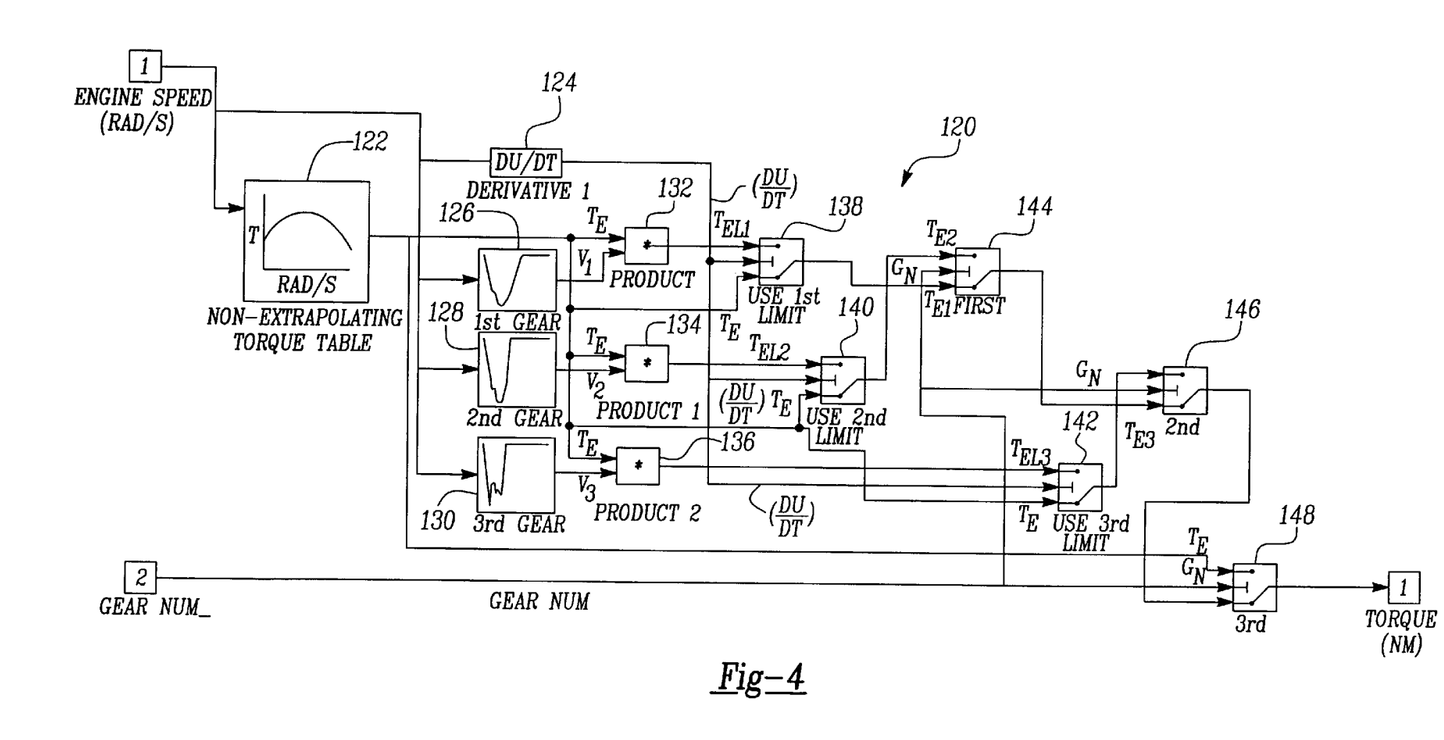
FIG. 4 is a data flow diagram illustrating the calculation of the engine torque available according to the principles of the present invention.

An amount of engine torque available $T_{EA}$ is determined at 120. With reference to FIG. 4, the engine torque available $T_{EA}$ is determined based upon an engine speed $S_E$ which is input into a non-extrapolating torque table 122 to provide an engine torque $T_E$. The derivative of the engine speed $S_E$ over time (du/dt) is calculated at 124. The engine speed $S_E$ is input into first gear, second gear, and third gear engine speed rise limiters 126, 128, 130, respectively, which each provide a look-up table to provide a multiplier which varies with the engine speed $S_E$. The multiplier obtained from first gear, second gear, and third gear rise limiters 126–130 are then multiplied by the maximum engine torque available $T_E$ to provide a modified maximum engine torque available $T_{EL1}$, $T_{EL2}$, $T_{EL3}$ at "Product" 132, "Product 1" 134, and "Product 2" 136, respectively. Based upon the calculated derivative of engine speed over time (du/dt), the "use 1st limit" 138, "use 2nd limit" 140, and "use 3rd limit" 142 boxes each determine whether to use the maximum engine torque available values $T_{EL1}$, $T_{EL2}$, $T_{EL3}$, or the maximum engine torque available $T_E$ values, respectively. Based upon the gear number (GN) that has been detected, boxes labeled "first" 144, "second" 146, and "third" 148, determine whether to use the calculated engine torque value based upon whether the transmission is in first gear, second gear, or third gear. If the transmission is in a gear higher than the third gear, the calculated maximum engine torque available $T_E$ is selected in box 148. In other words, blocks "first" 144, "second" 146, and "third" 148 determine which engine torque value to use based upon which gear number has been detected.

Figure 5:
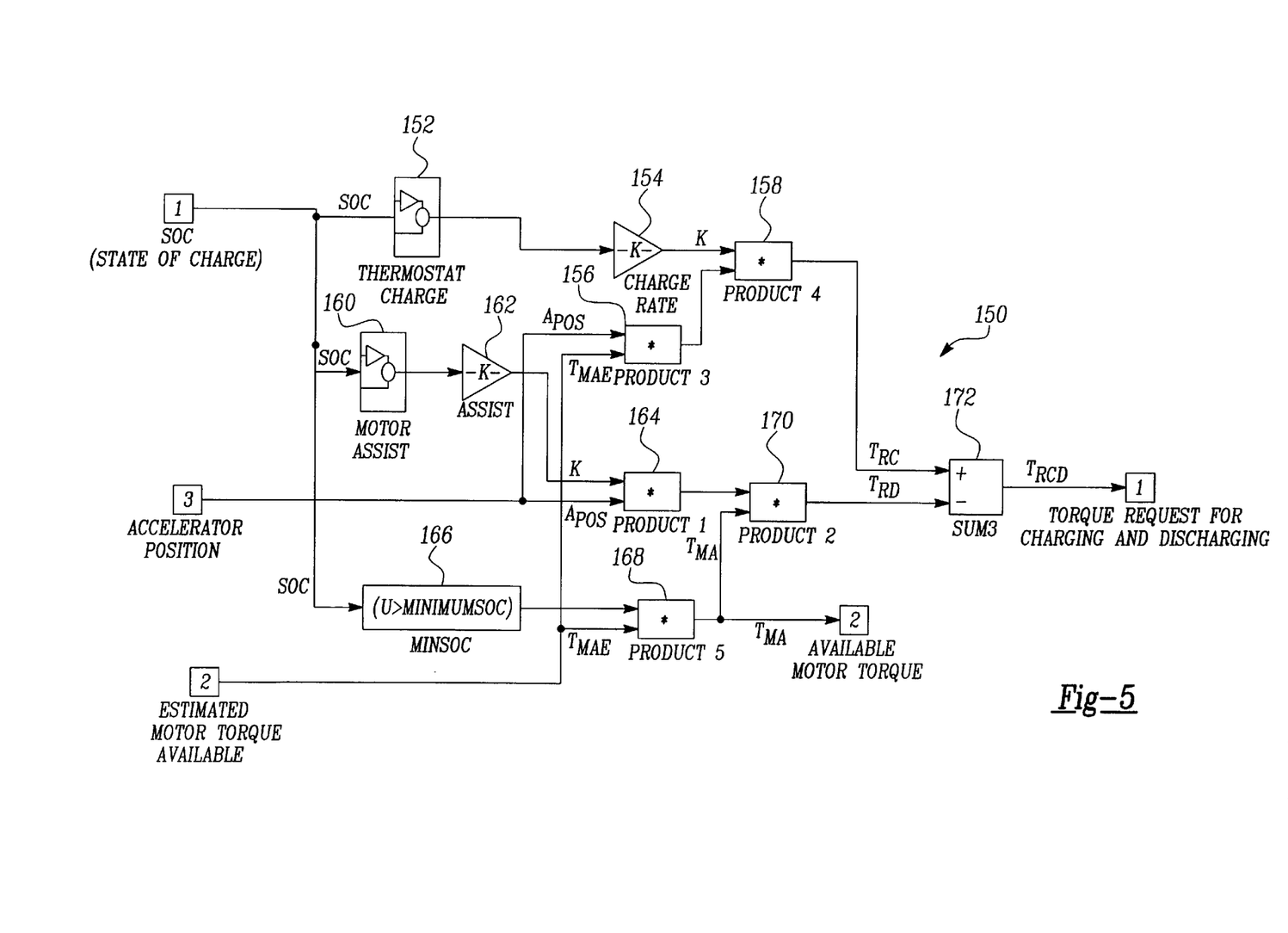
FIG. 5 is a data flow diagram illustrating the calculation of the motor torque available and the torque request for charging and discharging according to the principles of the present invention.

A torque request for charging and discharging TRCD as well as an available motor torque $T_{MA}$ is determined at the box labeled "SOC and motor torque assist" 150. With reference to FIG. 5, the battery state of charge SOC detected at 100 is input into box 152 labeled "Thermostat Charge." Box 152 provides a boolean output of "0" or "1." When the detected state of charge is below a predetermined level, then the output of box 152 is equal to 1 which indicates that the battery is low. This provides a charge rate command K (at 152) which will be described herein. At box 156, the accelerator position APOS is multiplied by the estimated motor torque available $T_{MAE}$ which provides an amount of torque available for charging the battery. This value is then multiplied by the charge rate constant K at box 158.

At box 160 labeled "motor assist", a boolean output of "0" or "1" is provided. The boolean output of "1" is provided when the detected state of charge is greater than a predetermined state of charge, generally indicating that the battery has a state of charge greater than a desired level. If the boolean operator is "1", then an assist command K is provided at box 162. If the boolean operator is "0", no assist command is provided. At box 164, the assist command K is multiplied by the detected accelerator position APOS. At box 166, it is determined whether the detected state of charge SOC is greater than a minimum state of charge (minimum SOC). Box 166 also provides a boolean operator. In the case that the state of charge SOC is greater than minimum SOC, a boolean operator equal to "1" is provided. When SOC is not greater than minimum SOC, a boolean operator equal to "0" is provided. The boolean operator from box 166 is multiplied by the estimated motor torque available at box 168. Accordingly, the calculated value $T_{MA}$ in box 168 is either equal to the estimated motor torque available $T_{MAE}$ or equal to zero in the case that the detected state of charge SOC is not greater than the minimum state of charge (minimum SOC). Effectively, if the state of charge SOC is not greater than the minimum state of charge, the motor torque available $T_{MA}$ is equal to zero. The motor torque available $T_{MA}$ is multiplied by the product of the accelerator position APOS multiplied by the assist command K (obtained in box 164), in box 170. This value which represents a torque discharge request $T_{RD}$ is subtracted from the determined limited torque amount available for charging $T_{RC}$ at box 172 to provide a torque request for charging and discharging $T_{RCD}$.

At box 176, labeled "Sum1", the calculated engine torque available $T_{EA}$ and motor torque available $T_{MA}$ are added to provide a total torque available $T_{TA}$. At box 178 labeled "requested torque" the calculated total torque available $T_{TA}$ is multiplied by the accelerator position APOS to provide a requested torque $T_R$. At box 180 labeled "Sum3", the requested torque $T_R$ is added to the calculated amount of requested torque for charging and discharging $T_{RCD}$, to provide a total torque request $T_{TR}$.

Figures 6, 6A:
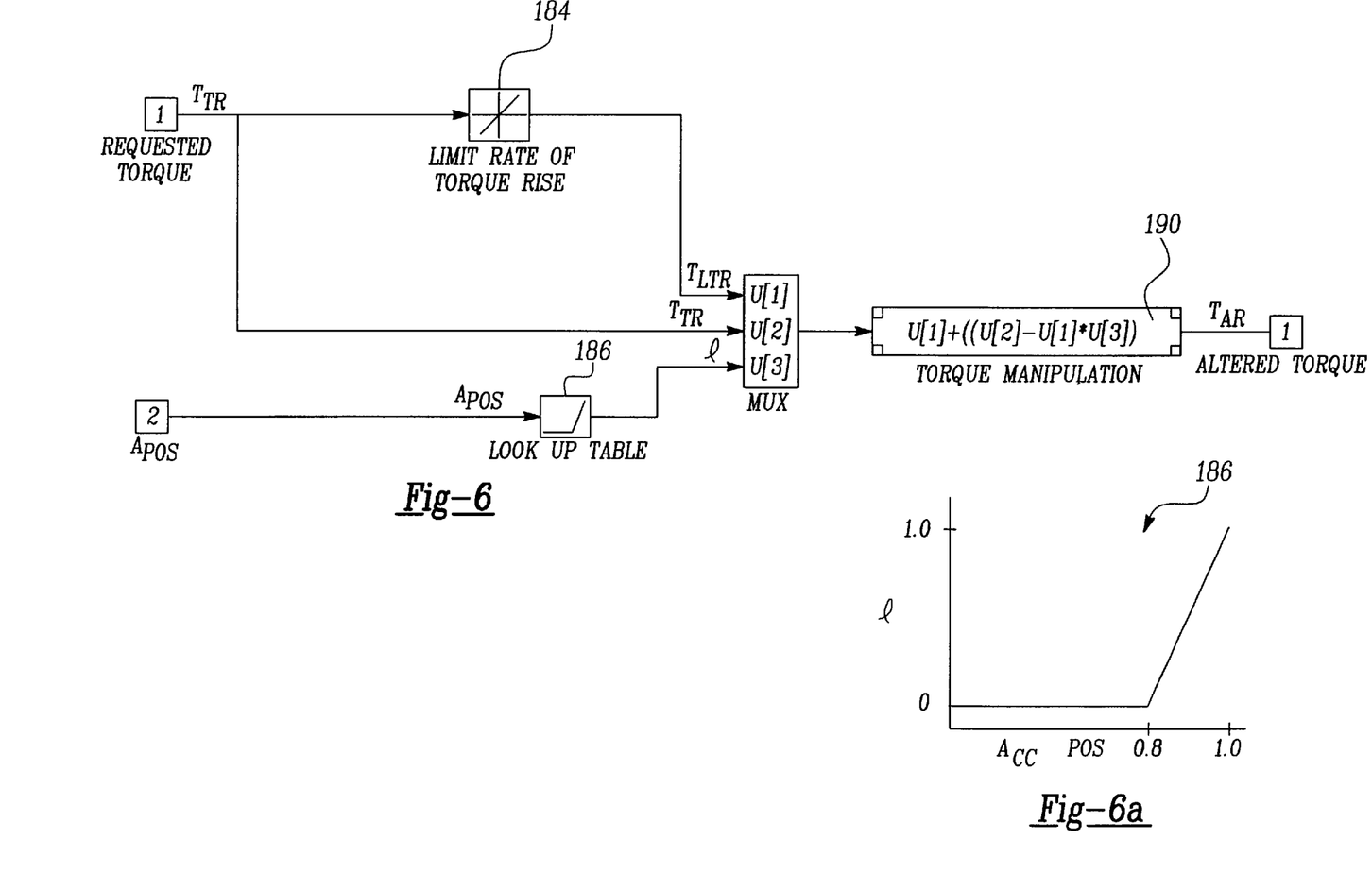
FIG. 6 is a data flow diagram illustrating the calculation of an altered torque request according to the principles of the present invention.
FIG. 6a is a graphical representation of a sample look-up table used in the data flow diagram of FIG. 6.
Figure 7:
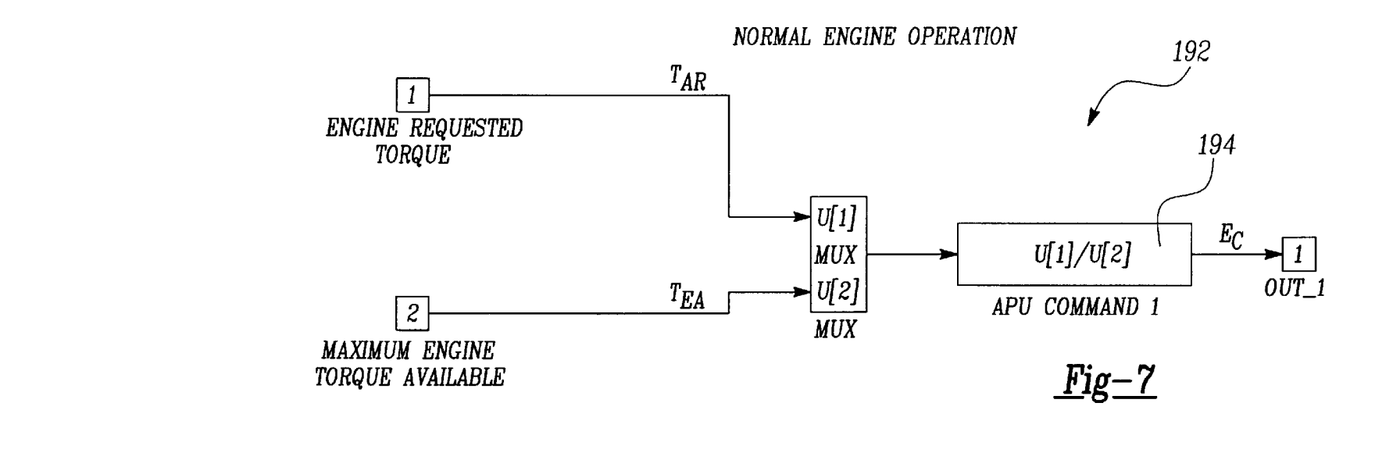
FIG. 7 is a data flow diagram illustrating the calculation of an engine control command according to the principles of the present invention.

At box 182, labeled "Torque assist", as shown in FIG. 6, the calculated total torque request $T_{TR}$ is limited at box 184 by a "limit rate of torque rise" characteristic curve, to provide a limited total torque request $T_{LTR}$. Typically, at the rate of torque rise of the engine increases, the engine emissions also increase. Therefore, the system of the present invention limits the rate of torque rise for the engine in order to minimize the engine emissions. However, when the vehicle is operated in an aggressive manner, as represented by the accelerator position APOS exceeding a predetermined value, the limits imposed on the rate of torque rise are reduced in order to provide the necessary torque response as required by the accelerator position APOS. In other words, the goal of reducing emissions is at least partially reduced in value in order to meet the requirements of aggressive acceleration commands. The factor of aggressive driving commands are taken into consideration at box 186 of FIG. 6, the accelerator position APOS is provided to a look-up table which provides a variable output based upon the accelerator position. For example, as shown in FIG. 6a, when the accelerator position is less than a predetermined value, for example 0.8 (representative of 80 percent open throttle) the value provided by look-up table 186 is equal to zero. However, between the predetermined accelerator position (0.8 for example) and wide open throttle (1.0), a linear relationship is provided for providing a limiting multiplier l which is multiplied by the difference between the total torque requested $T_{TR}$ minus the limited total torque requested $T_{LTR}$ calculated in box 184. The product of this value is then added to the limited total torque requested $T_{LTR}$ in box 190 to provide an altered torque request $T_{AR}$. In essence, when the value of the accelerator position is less than the predetermined value, the multiplier l is equal to zero. Therefore, the altered torque $T_{AR}$ is equal to the limited total torque request $T_{LTR}$. However, when the accelerator position exceeds the predetermined position (for example 0.8), the altered torque request $T_{AR}$ is equal to the limited total torque request $T_{LTR}$ plus the product of the total torque request $T_{TR}$ minus the limited total torque request $T_{LTR}$ times the multiplier l. As the multiplier l approaches 1, the altered torque request $A_{TR}$ approaches the total torque request $T_{TR}$. Therefore, the effect of limiting the engine torque rise is at least partially negated after the accelerator position exceeds the predetermined value. It should be understood that the example Look-Up Table as illustrated in figure 62 could be altered in many ways. For example, a non-linear or step increase in the value l may be utilized. In addition, as an alternative to the multiplier l, the system of the present invention could, upon the accelerator position reaching a predetermined value, ignore the limited total torque request $T_{LTR}$ and simply use the total torque request $T_{TR}$ as the altered torque $T_{AR}$ value. In effect, this would be the equivalent of using a step increase for l to go from "0" to "1" when accelerator position exceeded a predetermined value.

Figure 8:
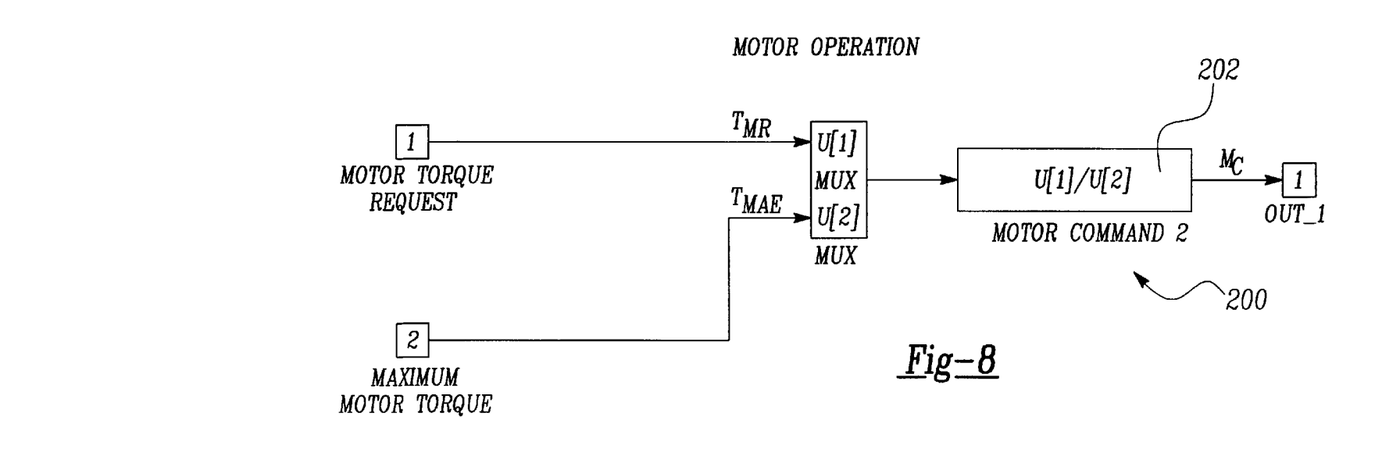
FIG. 8 is a data flow diagram illustrating the calculation of a motor control command according to the principles of the present invention.

In box 192, a normal engine command is determined. The engine command EC is equal to the ratio of the altered torque request $T_{AR}$ divided by the maximum engine torque available $T_{EA}$ as calculated in box 194 of FIG. 7. The engine command EC is then multiplied by the engine torque available $T_{EA}$ in box 196 to provide an engine torque request $T_{ER}$. The engine torque request $T_{ER}$ is then subtracted from the requested torque $T_R$ in box 198 to provide a motor torque request $T_{MR}$ in box 200, a motor command MC is determined as shown in FIG. 8. The motor command MC is equal to the ratio of the motor torque request $T_{MR}$ divided by the estimated motor torque available $T_{MAE}$ as calculated in box 202.

Accordingly, the engine and motor commands EC and MC are determined based upon a strategy to reduce emissions and provide the desired amount of driving torque.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hybrid electric powertrain system, comprising:
   a transmission for driving a pair of wheels of a passenger vehicle;
   a heat engine coupled to said transmission;
   an electric motor/generator coupled to said transmission;
   an accelerator pedal including a position sensor for detecting a position of said accelerator pedal; and
   a controller unit for generating electrical control signals to said heat engine and said electric motor/generator, wherein an electrical engine control signal is determined based upon a limited rate of torque rise and a detected accelerator position.

2. A hybrid electric powertrain system, comprising:
   a transmission for driving a pair of wheels of a passenger vehicle;
   a heat engine coupled to said transmission;
   an electric motor/generator coupled to said transmission;
   an accelerator pedal including a position sensor for detecting a position of said accelerator pedal;
   a controller unit for generating control signals to said heat engine and said electric motor/generator, wherein an engine control signal is determined based upon a limited rate of torque rise and a detected accelerator position; and
   wherein a motor control signal is determined based upon a difference between a determined torque request and a determined engine torque request.

3. The hybrid electric vehicle according to claim 2, wherein said determined torque request is determined based upon a determined amount of total torque available and a detected accelerator position.

4. The hybrid electric vehicle according to claim 3, wherein said determined amount of total torque available is determined based upon a determine amount of engine torque available and a determined amount of motor torque available for driving.

5. The hybrid electric vehicle according to claim 4, wherein said controller determines a torque request for charging a vehicle battery based upon a detected state of charge of the battery.

6. A method of controlling a hybrid electric powertrain system including a heat engine and an electric motor/generator each coupled to a transmission for driving a pair of wheels of a passenger vehicle, comprising the steps of:
   a. determining an amount of motor torque available;
   b. determining an amount of engine torque available;
   c. determining an amount of motor torque that can be used to assist the engine in driving the vehicle;
   d. determining an amount of engine torque required for battery charging;
   e. determining a total amount of driving torque available by adding said determined amount of motor torque available for driving and said determined amount of engine torque available;
   f. determining an amount of requested torque based upon a detected accelerator position and said determined total amount of driving torque available;
   g. calculating a total torque request by adding said determined amount of torque required for battery charging and said determined amount of requested torque;
   h. determining a limited total torque request based upon a limited rate of increase for the calculated total engine torque request and said detected accelerator position; and
   i. determining an altered torque request based upon said calculated total torque request, said determined limited total torque request and said detected accelerator position.

7. The method according to claim 6, further comprising the steps of:
   determining an engine command based upon said determined amount of engine torque available and said determined altered torque request.
   calculating a motor torque request by subtracting an engine torque request from said determined amount of requested torque; and
   determining a motor command based upon said calculated motor torque request and said determined amount of motor torque available.

8. A method of controlling a hybrid electric powertrain system including a heat engine and an electric motor/generator each coupled to a transmission for driving a pair of wheels of a passenger vehicle, comprising the steps of:
   detecting a state of charge of a vehicle battery, an accelerator position, a value representative of a current transmission gear ratio, engine speed and motor speed;
   determining an amount of motor torque available, based upon a detected motor speed;
   determining an amount of engine torque available based upon a detected engine speed and a detected value representative of a current transmission gear ratio;
   determining an amount of motor torque that can be used to assist the engine in driving the vehicle based upon a detected battery state of charge, a detected accelerator position and a determined amount of motor torque available;
   determining an amount of engine torque required for battery charging and alternatively an amount of motor torque required for discharging stored energy from said battery based upon a detected battery state of charge, a determined amount of motor torque available and a detected accelerator position;
   determining a total amount of driving torque available by adding said determined amount of motor torque available for driving and said determined amount of engine torque available;

determining an amount of requested torque based upon said detected accelerator position and said determined total amount of driving torque available;

calculating a total amount of engine torque requested by adding a determined amount of torque required for battery charging and a determined amount of requested torque;

determining a limited engine torque requested amount based upon a limited rate of increase for the calculated total amount of engine torque requested and said detected accelerator position;

calculating a motor torque request amount by subtracting a determined limited engine torque requested amount from a determined amount of requested torque;

determining a motor command based upon said calculated motor torque request amount and said determined amount of motor torque available; and determining an engine command based upon said determined amount of engine torque available and said determined limited engine torque request amount.

* * * * *